Dec. 16, 1930.   W. J. SCHOONMAKER   1,785,330
MOVING PICTURE SCREEN FOR USE IN CONNECTION WITH SOUND PICTURE
Filed March 7, 1929
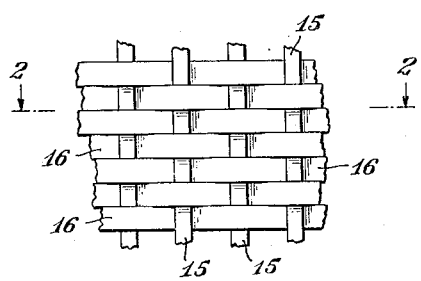
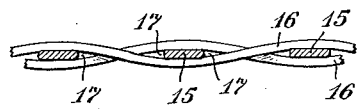
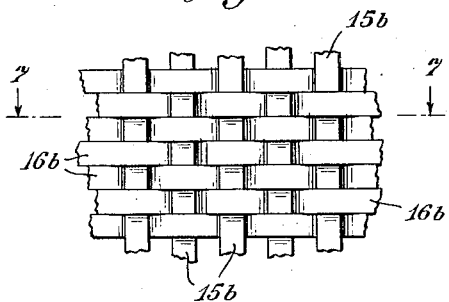
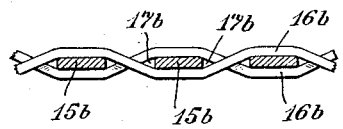
INVENTOR
William J. Schoonmaker
BY
ATTORNEY Patented Dec. 16, 1930

1,785,330

UNITED STATES PATENT OFFICE

WILLIAM J. SCHOONMAKER, OF NEW YORK, N. Y.

MOVING-PICTURE SCREEN FOR USE IN CONNECTION WITH SOUND PICTURES

Application filed March 7, 1929. Serial No. 345,032.

This invention relates to new and useful improvements in sound picture screens of the class adapted for the reproduction of talking pictures, and it has been an object of this invention to present a creation along this line or rather an embodiment of ideas and principles, whereby the cooperation of a picture display with the reproduction of sound may attain the desired state of perfection.

Hitherto the screens employed on the moving picture stage, until the introduction of the so-called talking films, were made with one object in mind, that is, to yield the most effective reflection according to the individual surroundings.

However, as the science relative to sounds has reached a stage where the phonetics may be controlled and in a certain sense embodied and made to cooperate with a film display, it has become incumbent to device a medium in the form of a screen which would offer suitable conditions to the passage of sounds and at the same time avoid impairing the reflection of light thrown upon the screen for the display of a talking picture. The apparatus used for producing the sound in talking pictures directs the sound upon the rear surface of the screen and it is very essential that the sound may efficiently pass through the screen for producing a perfect and desirable sound effect of the characters shown on the screen. At the same time it is very essential that the light thrown upon the front of the screen for showing the moving pictures should not pass through the screen and become wasted but rather should be reflected towards the audience.

Through extensive experimentations most desirable results have been obtained in this respect as disclosed in the present device, which is formed with air passages communicating with the front and rear of the screen and closely arranged all over the entire surface none of the said air passages being exposed in alignment with the rays of light thrown upon the screen, which construction permits the passage of sound through the screen from the sound device in back of the screen, but does not permit the passage of light through the screen from the projector in front of the screen.

It is proposed that the invention should make use of a plurality of adjacent warp strips interwoven with a plurality of spaced weft strips so that a plurality of air passages exist adjacent the warp strips and between the weft strips. This arrangement permits the passage of air vibrations from the rear to the front of the screen but prohibits the passage of light from the front to the rear of the screen.

It is thought advisable to here point out that sound waves traveling through air merely vibrate the air and thus advance through the air while the air itself remains comparatively stationary. For this reason if the air on the front and rear of the screen is joined as contemplated sound vibrations may readily pass through the screen. Light rays travel only in straight lines though of course they may be reflected. Since the passages are so arranged as to prohibit a straight line connection from the direction of rays of light normally thrown by a moving picture camera upon the front of a screen the passage of such rays through the screen is arrested.

For further comprehension of the invention, and of the objects and advantage thereof, reference will be had to the following description and accompanying drawings and to the appended claims in which the various novel features of the invention are more particularly set forth.

In the accompanying drawings forming a material part of this disclosure:—

Figure 1 is an elevational view of a fragmentary portion of a screen constructed according to this invention.

Fig. 2 is an enlarged horizontal sectional view taken on line 2—2 of Fig. 1.

Fig. 3 is a front elevational view of a fragmentary portion of a screen constructed according to a further modified form of the invention.

Fig. 4 is a horizontal sectional view taken on the line 7—7 of Fig. 3.

In Figs. 1 and 2 the reference numeral 15 indicates a plurality of spaced weft strips all in a common plane, and numeral 16 a plurality of warp strips adjacent to each other and interwoven with weft strips. The weft strips preferably are spaced from each other so that portions of the warp strips lie in planes to the front and rear of the weft strips and parallel to the said common plane, and other portions of the warp strips lie in crossing planes positioned between the weft strips.

The crossing portions of the warp strips over and under the weft strips produce air passages 17 positioned between the weft strips and adjacent to the warp strips. These air passages cannot be seen when viewing the screen from the front or rear but in viewing the screen from the top or bottom they may be seen as clearly shown in Fig. 2 which illustrates a sectional view.

It is preferable to make the warp strips broader and thinner than the weft strips, thus producing substantially larger air spaces, and it would obviously be immaterial whether the said strips lie horizontal or vertical.

In the modified form illustrated in Figs. 3 and 4, the warp strips 16$^b$ are of widths substantially equal to the widths of the weft strips 15$^b$. The warp strips 16$^b$ are adjacently positioned while the weft strips are slightly spaced so that air passages 17$^b$ exist between the rear and the front of the screen.

In the foregoing form the very close positioning of the warp strips are depended upon to restrict the passage of light rays through the screen.

The material from which the various strips are made, preferably should be such as to readily reflect light as required for moving picture screens and at the same time present a surface, which will readily lend itself to a cleaning process while hung on a frame.

While I have illustrated and described my invention with some degree of particularity I realize that in practice various alterations therein may be made. I therefore reserve the right and privilege of changing the form of the details of construction or otherwise altering the arrangement of the correlated parts without departing from the spirit or the scope of the appended claims.

What I claim as new, and desire to secure by Letters Patent of the United States, is

1. A woven sound picture screen comprising a plurality of adjacent substantially rectangular warp strips interwoven with a plurality of spaced weft strips so as to produce air passages on either side of the weft strips and between the warp strips, said warp strips having adjacent edges tightly engaged with each other for providing substantial light proof seams.

2. A woven sound picture screen comprising a plurality of adjacent warp strips interwoven with a plurality of spaced weft strips so as to produce air passages on either side of the weft strips and between the warp strips, said warp strips being substantially rectangular in horizontal cross section.

3. A woven sound picture screen comprising a plurality of adjacent substantially rectangular warp strips interwoven with a plurality of spaced weft strips so as to produce air passages on either side of the weft strips and between the warp strips, said warp and weft strips being of substantially unequal sizes in cross section.

4. In a device of the class described, a sound picture screen made by an interlacing of weft and substantially rectangular warp strips in such a manner as to leave a curvature between the said strips running in opposite direction, and forming air passages at a vertical or obtuse angle to the surface but out of alignment with rays of light striking the screen substantially horizontally.

Signed at New York city, in the county of New York and State of New York this 5th day of March, A. D. 1929.

WILLIAM J. SCHOONMAKER.